2,557,084

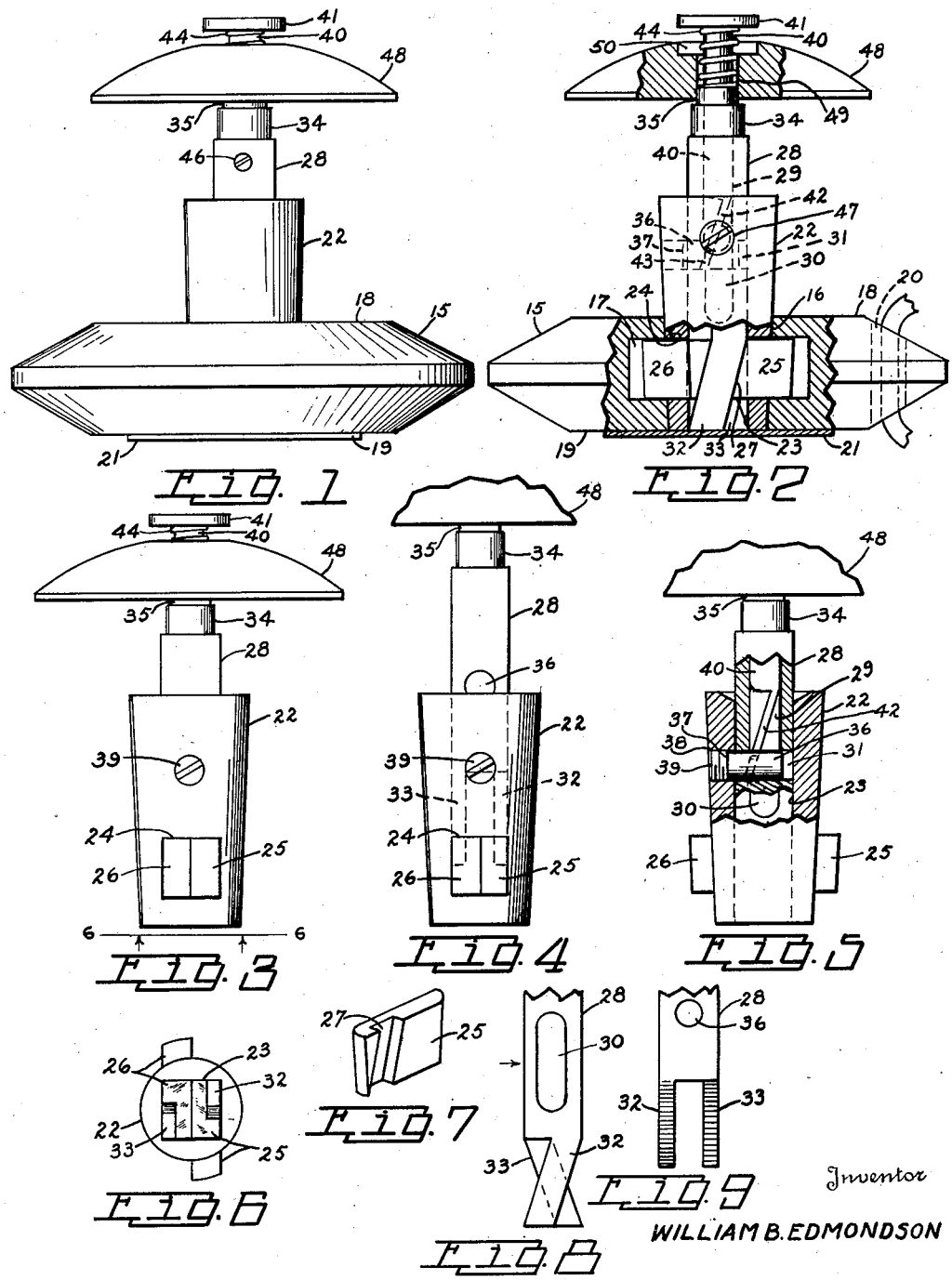

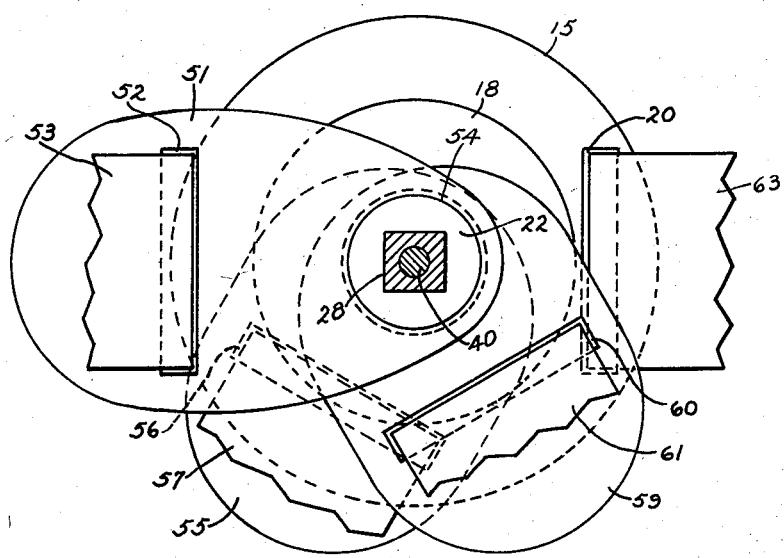
Fig. 10
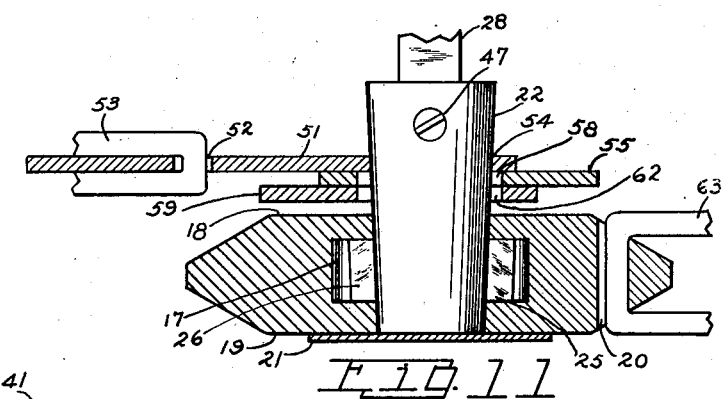
Fig. 11
Fig. 12
Inventor
WILLIAM B. EDMONDSON
By F.J.Schmitt
Attorney Patented June 19, 1951

UNITED STATES PATENT OFFICE 2,557,084

SELF-LOCKING COUPLING PIN FOR PARACHUTE HARNESS QUICK-RELEASE

William B. Edmondson, United States Marine Corps

Application March 14, 1946, Serial No. 654,486

6 Claims. (Cl. 24—73)

(Granted under the act of March 3, 1883, as amended April 30, 1928; 370 O. G. 757)

The present invention relates to improvements in a self-locking coupling pin for parachute harness quick-release.

An object of the present invention is the provision of a quick-release fastening that is capable of withstanding high stresses, one that is simple in construction and reliable in operation.

Another object of the present invention is the provision of a quick-release formed of simple elements that may be manufactured at a minimum of cost and readily assembled.

A still further object of the present invention is the provision of a quick-release pin that will release all necessary straps instantaneously.

A still further object of the present invention is the provision of slidable locking means for the release pin.

A still further object of the present invention is the provision of a quick-release coupling pin that may not be accidentally released.

Although the application is drawn to a quick-release parachute harness I do not wish to confine my device to a harness per se as the device is susceptible for use in conjunction with coupling a tractor, truck, tank, or other self-propelled vehicles to implements such as wagons, trailers, scrapers, plows, graders, harrows, cultivators, planters, and artillery.

With these and other objects in view, the invention consists in the combination and arrangement of parts to be hereinafter described and claimed, reference being had to the accompanying drawings in which the numerals of reference designate similar parts in the several views and wherein:

Fig. 1 is an elevational view of the parachute harness quick-release in assembled locked position;

Fig. 2 is an elevational view of the parachute harness quick-release in assembled locked position, portions being broken away and in section, disclosing some of the operating mechanism;

Fig. 3 is an elevational view of the locking pin housing, viewed from an angle different from that shown in Fig. 2;

Fig. 4 is an elevational view of Fig. 3, the locking pin and sliding dogs being shown in unlocked position;

Fig. 5 is an elevational view of the locking pin housing viewed from an angle different from that shown in Fig. 3, parts being broken away and in section illustrating some of the operating mechanism;

Fig. 6 is a bottom plan view taken on line 6—6 of Fig. 3;

Fig. 7 is a perspective view of one of the locking dogs;

Fig. 8 is a fragmentary elevational view of one of the movable elements, and illustrates the opposed relation of the dog engaging means;

Fig. 9 is a fragmentary elevational view of the movable element illustrated in Fig. 8, looking in the direction of the arrow and showing the dog engaging means in spaced relation;

Fig. 10 is a top plan view illustrating strap eyelet plates in the locking pin housing, the locking pin housing being in locked position in the circular plate, parts being shown in section;

Fig. 11 is a sectional view in elevation of Fig. 10 and illustrates the arrangement of the strap eyelets on the locking pin, when the locking pin and housing are in locked position; and Fig. 12 is an elevational view of the release pin.

Referring to the drawings, the numeral 15 represents a circular plate or recessed receiving member of suitable material having beveled walls, a tapering central bore 16, an internal groove 17 that is in communication with the bore 16, the top surface 18, and the bottom surface 19 of the plate being flat, the plate adjacent its peripheral edge having a slot 20. To the bottom face of the plate 15, there is secured by any suitable means a disc 21.

Adapted for engagement with, and disengagement from, the tapering bore 16 is a locking pin housing 22, the peripheral wall of the housing being tapered to conform to the tapered bore 16. The locking pin housing 22 is provided with a square longitudinal bore 23 and a square transverse bore 24 adjacent the lower end of the housing 22. Within the transverse bore 24, there is mounted for sliding movement a pair of latches such as dogs 25 and 26, each dog having an angularly disposed channel 27, the dogs being so mounted in the bore that the channels 27 are in opposed relation to each other for a purpose to be later described.

Within the bore 23 there is mounted a locked pin 28 having a bore 29, a groove 30, a transverse bore 31, the lower portion of the locking pin having legs 32 and 33 that are angularly disposed to each other and in spaced relation, the leg 32 engaging the slot in the dog 25, the leg 33 engaging the slot in the dog 26. The upper end of the locking pin is provided with a reduced rounded portion 34 and a further reduced rounded portion 35. The bore 31 houses a pin 36 that is adapted for horizontal movement, one end 37 of the pin extending into a threaded bore 38 that receives a threaded screw 39. Within the bore 29 is a release shaft 40 having a button 41 on one end and an angularly disposed finger 42 on the opposite end that engages an angularly disposed bore 43 in the pin 36. Interposed between the top of the reduced end 35 and the button 41 is a spring 44 that holds the finger 42 partially out of engagement with the bore 43. The release shaft 40 is provided with a groove 45 that is engaged by a screw 46 in one wall of the locking pin 28 that limits the movement of the shaft. A screw 47 in the locking pin housing 22 engages the grooves 30 and serves as a retaining means for the slidable locking pin in the housing.

To the reduced portion 35 is fitted a handle 48 having a bore 49 that provides for a wedge fit on the portion 35, or if desired, the portion 35 may be threaded as well as the lower portion of the bore 49. Communicating with the bore 49 is an enlarged recess 50 that is adapted to receive the button 41 when the button is pressed down. The spring 44 encompassing the release shaft 40 is housed in the bore 49.

In Fig. 10 I have shown a top plan view of strap plates on the locking pin housing. The strap plate 51 is provided with a slot 52 that receives a strap 53, and a circular opening 54 of a predetermined size. The opening 54 allows the plate 51 to be positioned at a predetermined point on the locking pin housing and if desired may be welded to the housing to prevent accidental loss of the locking pin when disengaged from plate 15. Leg strap plate 55 is provided with a slot 56 that receives a leg strap 57 and an opening 58 which is of greater diameter than the locking pin housing or the opening 54. The leg strap plate 59 is provided with a slot 60 that receives a leg strap 61, and an opening 62 which is of a diameter equal to the diameter of the opening 58. The slot 20 receives a strap 63, the strap preventing the plate 15 from being lost when the locking pin is released from the plate 15.

It will thus be seen that the releasable coupling comprises a receiving member 15, into which and from which an insertable and removable portion may be inserted or wholly removed. The disc 21 and the tapering sides of the receiving member 15 function as stops. The more complex insertable portion comprises a housing 22 for the locking pin 28 and release shaft 40 which form a concentric telescoping assembly. The telescoping members 28 and 40 have limited relative longitudinal movement. This movement is used for individually and sequentially operating the dog latches 25, 26 and the latch or pin 36 by the cam end portions represented by angularly disposed legs 32 and finger 42. The sequential operation of the latches provide for a strong coupling with a relatively light control as the larger latches are released by the longitudinal withdrawing motion which bodily separates the coupling components.

In the operation of the present device, the locking pin housing 22 with its associated mechanism is normally in locked engagement with the plate 15, to prevent loss of the housing. When an aviator desires to attach the parachute harness, the button 41 is depressed, the shaft or rod 40 moving downwardly forces the horizontal pin 36 to the right (Fig. 5), the end 37 moving out of engagement of the bore 38. With the shaft or rod 40 depressed, the locking pin 28 is pulled upwardly, this upward movement causing the dogs 25 to move in opposed directions into the housing 22 until the end walls of the dogs are uniplanar with the outer peripheral wall of the housing. The movement of the dogs inwardly into the housing 22 is due to the legs 32 and 33 being disposed at an angle and in contact with the angularly disposed groove in the dogs, thus causing the dogs to slide as the legs move upwardly, the dogs moving out of engagement with the groove 17. The locking pin, during the upward movement, is limited due to the end of screw 65 engaging the groove 30. The locking pin housing 22 is then released from the plate 15. The aperture 54 in the strap plate 51 is placed on the housing 22 until it reaches a predetermined point on the housing, and then successively are placed on the housing, the strap plates 55 and 59. With the plates 51, 55, and 59 on the housing 22, the housing is inserted into the bore 16 until the bottom face of the housing 22 impinges the top face of the plate 21. The locking pin 28 is pushed downwardly, the downward movement of the locking pin 28 forcing the dogs 25 and 26 in opposed directions outwardly, the dogs engaging the groove 17 in the plate 15, thus locking the housing 22 to the plate 15. To release the plates 51, 55, and 59, it is simply necessary to push down on the button 41 and pull upwardly and as the housing 22 moves out of engagement of the bore 16, the strap plates 51, 55, and 59 drop off of the housing 22. The strap plate 51 will not wedge in the housing 22 for the reason that the wall of the aperture is vertical while the outer wall of the housing 22 is tapered, only a small area of the aperture wall of the strap plate 51 contacting the tapered wall of the housing 22.

If the quick-release self-locking device is used in conjunction with self-propelled vehicles, a tongue from such devices as wagons, trailers, etc., would have a strap having an aperture for engagement with housing 22.

It is to be understood that while the embodiment of the invention which has been described is to be preferred, changes may be made in the construction and arrangement of parts without departing from the spirit and scope of the appended claims.

The invention described herein may be manufactured and used by or for the Government of the United States of America for governmental purposes without the payment of any royalties thereon or therefor.

What is claimed is:

1. An insertable and removable portion of a releasable coupling device for use with a receiving member having a recess with an internal communicating groove, and a stop for limiting the extent of entry of the insertable and removable portion, said portion including a housing, two telescoping longitudinally movable members within the housing, each of said telescoping members having cam end portions, stops for limiting the relative amount of said longitudinal movements, separate latch means in contact with each cam end portion for receiving transverse movement through aligned openings between the internal groove and the housing and between the outer telescoping member and the housing respectively, the cam on the outer telescoping member being in contact with the latch entering the said interval groove, said cams being shaped so that longitudinal movement of the inner telescoping member will unlatch the outer telescoping member from the housing, and subsequent opposite longitudinal movement, while the housing is unlatched for limited movement, will withdraw the other latch within the periphery of the housing.

2. A releasable coupling device comprising a receiving portion, said receiving portion being recessed and having an internal groove communicating with the recess and an insertable and retractable portion to be inserted in said recess, means integral with the receiving portion for limiting the extent of entry of the insertable and retractable portion into said recess, said receiving portion being recessed and having an internal groove communicating with the recess, said insertable and retractable portion including a tubular housing which fits recess of the receiving portion, two telescoping longitudinally relatively movable members within the housing, each of said members having cam end portions, separate latch means contacting each cam end portion for receiving transverse movement through aligned openings between the internal groove and the housing and between the outer telescoping member and the housing respectively, the said cams being constructed so that longitudinal movement of a telescoping member in one direction will move a latch means to unlatch the telescoping member and housing, and subsequent longitudinal movement in the opposite direction of the other of said telescoping member will withdraw the other latch from the internal groove of the receiving portion whereby the insertable and retractable portion may be bodily removed.

3. The combination of claim 2 further defined in that the latch means for the housing and receiving portion is a channeled dog the channel of which constitutes a cam track for the cam of the said outer telescoping member.

4. The combination of claim 2 further defined in that the outer telescoping member has a stop for engaging the inner telescoping member and limiting its movement to a predetermined extent.

5. The combination of claim 2 further defined in that a spring is provided which bears on the two telescoping members and presses the inner member so that the first of said longitudinal movements will be against the pressure of said spring.

6. A releasable coupling device comprising a latch plate having a bore and an internal groove transverse to and in communication with the bore, coupling means insertable into and retractable from said latch plate bore, said means including a tubular locking pin housing and centrally recessed locking pin therein, a latching dog movable transversely of the housing and from the housing into the said internal transverse groove of the latch plate, latch means for locking said locking pin to said housing and means for unlatching the locking pin for longitudinal movement relative to its housing, said locking pin having an angularly disposed leg in cam engagement with the said latching dog, said latch means for the locking pin being positioned for motion transversely of the recessed portion and supported by perforated walls of the locking pin, said perforations being aligned with a recess in the locking pin housing into which the end of the transverse latch member may be moved, said unlatching means for the locking pin being positioned with the recess of the locking pin and having an angularly disposed end portion engaging the latch so that downward motion of the unlatching means will move the latch within the outline of the locking pin and withdrawal of the locking pin will initiate cam action on the dog withdrawing it from the latch plate groove into the housing for separation of the coupling.

WILLIAM B. EDMONDSON.

REFERENCES CITED

The following references are of record in the file of this patent:

UNITED STATES PATENTS

| Number | Name | Date |
| --- | --- | --- |
| 1,566,023 | Kuchner | Dec. 15, 1925 |
| 1,920,408 | Lafayette | Aug. 1, 1933 |
| 2,108,716 | Kuhlemann | Feb. 15, 1938 |
| 2,393,072 | Skinner | Jan. 15, 1946 |

FOREIGN PATENTS

| Number | Country | Date |
| --- | --- | --- |
| 8,640 | Great Britain | of 1905 |
| 149,107 | Great Britain | of 1920 |